US008812225B2

(12) United States Patent
Pun

(10) Patent No.: US 8,812,225 B2
(45) Date of Patent: Aug. 19, 2014

(54) ELECTRONIC NAVIGATION DEVICE FOR A HUMAN AND RELATED METHODS

(75) Inventor: Ngan-cheung Pun, San Diego, CA (US)

(73) Assignee: Harris Corporation, Melbourne, FL (US)

(*) Notice: Subject to any disclaimer, the term of this patent is extended or adjusted under 35 U.S.C. 154(b) by 732 days.

(21) Appl. No.: 13/097,526

(22) Filed: Apr. 29, 2011

(65) Prior Publication Data

US 2012/0277992 A1   Nov. 1, 2012

(51) Int. Cl.
| | |
|---|---|
| *G01C 21/10* | (2006.01) |
| *G01C 21/16* | (2006.01) |
| *G01C 25/00* | (2006.01) |
| *F41G 7/00* | (2006.01) |
| *G01C 19/5776* | (2012.01) |
| *G01C 21/28* | (2006.01) |

(52) U.S. Cl.
CPC .............. *G01C 21/16* (2013.01); *G01C 25/005* (2013.01); *F41G 7/007* (2013.01); *G01C 19/5776* (2013.01); *G01C 21/28* (2013.01)
USPC .......................................... 701/200; 701/502

(58) Field of Classification Search
CPC .. G01C 21/16; G01C 25/005; G01C 19/5776; G01C 21/28; F41G 7/007
USPC ......... 701/502, 32.9, 468, 533; 702/141, 142, 702/150, 149, 160; 345/158, 156; 73/514.31, 35.01; 340/870.02; 342/451; 700/91; 706/46; 416/61
See application file for complete search history.

(56) References Cited

U.S. PATENT DOCUMENTS

| | | | |
|---|---|---|---|
| 6,522,266 B1 | 2/2003 | Soehren et al. | 340/988 |
| 6,594,617 B2 | 7/2003 | Scherzinger | 702/160 |
| 7,747,409 B2 | 6/2010 | Ladetto et al. | 702/150 |
| 2007/0208531 A1* | 9/2007 | Darley et al. | 702/142 |
| 2009/0085865 A1* | 4/2009 | Fattah | 345/156 |
| 2009/0254276 A1 | 10/2009 | Faulkner et al. | 701/213 |
| 2009/0325694 A1* | 12/2009 | Beckman et al. | 463/31 |
| 2010/0057398 A1* | 3/2010 | Darley et al. | 702/160 |
| 2010/0241347 A1* | 9/2010 | King et al. | 701/201 |
| 2010/0268458 A1 | 10/2010 | Becker et al. | 701/208 |
| 2011/0251822 A1* | 10/2011 | Darley et al. | 702/149 |

OTHER PUBLICATIONS

Greenbelt, MD (PRWEB), TRX Systems Announces DARPA Award to Support Accurate Infrastructure-Free Tracking of Personnel in Underground Environments, Feb. 9, 2011, pp. 1-5.
Johann Borenstein, Personal Dead-reckoning (PDR) System for Firefighters, Aug. 2, 2010, pp. 1-13.
Eric Foxlin, Pedestrian Tracking with Shoe-Mounted Inertial Sensors, Nov./Dec. 2005, pp. 38-46.

* cited by examiner

*Primary Examiner* — Behrang Badii
(74) *Attorney, Agent, or Firm* — Allen, Dyer, Doppelt, Milbrath & Gilchrist, P.A.

(57) ABSTRACT

An electronic navigation device for a human user may include a housing to be carried by the human user, and at least one accelerometer carried by the housing and configured to sense acceleration during motion of the human user. The electronic navigation device may also include a controller carried by the housing and coupled to the at least one accelerometer. The controller may be configured to generate a plurality of acceleration sample values as the human user moves over a given distance, and determine an estimated distance traveled by the human user during movement over the given distance by at least multiplying each acceleration sample value by a scaling constant. The controller may also be configured to sum results thereof.

20 Claims, 7 Drawing Sheets

US 8,812,225 B2

ELECTRONIC NAVIGATION DEVICE FOR A HUMAN AND RELATED METHODS

FIELD OF THE INVENTION

The present invention relates to the field of navigation, and, more particularly, to electronic navigation for a human user and related methods.

BACKGROUND OF THE INVENTION

A position of a person or object may be determined using a global positioning system (GPS) receiver, for example. However, to use a GPS receiver, a GPS antenna coupled to the GPS receiver must have a line of sight to GPS satellites. For increased accuracy, the number of GPS satellites having a line of sight to the GPS antenna increases. In other words, position determining using a GPS receiver will not work indoors, for example, or other location where the GPS antenna does not have a line of sight to the sky.

In such GPS "denied" locations, a person or object may be tracked using an inertial measurement unit (IMU). An inertial measurement unit may cooperate with an accelerometer to calculate displacement, for example. More particularly, a determined acceleration may be first integrated over a time period to determine a velocity. The velocity may be integrated over the time period to determine the displacement. In other words, a double integration is performed on the acceleration to arrive at the displacement.

Velocity drift due to accumulation of errors or noise may contribute to inaccuracies in determining the displacement over the time period. Additionally, gyroscope drift and bias in systems that include a gyroscope, for direction, for example, may also contribute to displacement inaccuracies over the time period.

Moreover, performing the double integration of the determined acceleration over the time period, especially if the time period is relatively long or includes a relatively large amount of data samples from the accelerometer, introduces a relatively large error over the time period. For example, performing a double integration of acceleration measurements made while walking 200 meters in a rectangle may lead to an error in displacement of greater than 8 kilometers, for example.

Referring to FIGS. 1a-1d, to illustrate the error in displacement, acceleration data from two accelerometers is measured over sixty seconds and illustrated by overlapping curves 21, 22, in graph 20 (FIG. 1a). Typical noise/bias numbers in an inertial measurement unit (IMU) are used according to:

Acceleration $A(t) = (\sin(t*2\pi) + 0.00) * 0.5 * g$

Acceleration $B(t) = (\sin(t*2\pi) + 0.05) * 0.5 * g$ where t is time, and g is the gravitational constant.

A noise bias of 0.05 G is used. A first integration of the acceleration curves 21, 22 from the graph 20 results in velocity curves 24, 25 in graph 23 illustrated in FIG. 1b. A second integration of the accelerations (i.e. an integration of the velocity) results in displacement lines 27, 28, illustrated in the graph 26 in FIG. 1c. Illustratively, the displacements 27, 28 are separated by about 100 meters. This error is translated in to a distance error, which is illustrated by the curve 29 in graph 30 in FIG. 1d.

One approach to address the problem of a relatively large error resulting from integration over a relatively short time involves mounting the IMU in a shoe of a human user, for example. The human user's steps or movements are characterized or determined, for example by a zero velocity. A measured acceleration is twice integrated over the time period between the determined steps to calculate the displacement over the time period, or the step. By using each step as the time period for integration, error from integration is reduced compared to integrating over an entire movement. In other words, accumulated errors are thus "zeroed out" after each step.

U.S. Pat. No. 6,522,266 to Soehren et al. discloses navigation system for foot travel. More particularly, Soehren et al. discloses a system that includes an inertial processing unit coupled to a motion sensor. The inertial processing unit determines a first position estimate based upon the motion sensor, and more particularly, a step length. The system also includes a motion classifier to determine a step distance estimate, and a Kalman filter that determines corrective feedback signals based upon a first position estimate, the distance estimate, and past and present values of motion signals.

SUMMARY OF THE INVENTION

In view of the foregoing background, it is therefore an object of the present invention to provide an increased accuracy and reduced complexity electronic device for measuring a distance traveled by a human user.

This and other objects, features, and advantages in accordance with the present invention are provided by an electronic navigation device for a human user that includes a housing to be carried by the human user, and at least one accelerometer carried by the housing and configured to sense acceleration during motion of the human user. The electronic device also includes a controller carried by the housing and coupled to the at least one accelerometer. The controller is configured to generate a plurality of acceleration sample values as the human user moves over a given distance, and determine an estimated distance traveled by the human user during movement over the given distance by at least multiplying each acceleration sample value by a scaling constant, and summing results thereof. Accordingly, the electronic navigation device advantageously provides increased accuracy for measuring a distance traveled by a human user.

The controller may be configured to determine a bounding curve based upon the plurality of acceleration sample values, for example. The controller may determine the estimated distance based upon the bounding curve. The bounding curve may include a logarithmic bounding curve. The bounding curve may also include an exponential curve, for example.

The at least one accelerometer may include a plurality of accelerometers configured to sense acceleration along respective different axes. The controller may be configured sum the sensed accelerations from each of the plurality of accelerometers. The controller may be configured to generate the plurality of acceleration sample values based upon the summed sensed accelerations, for example.

The controller may be configured to determine an absolute value of the summed sensed accelerations. The controller may be configured to generate the plurality of acceleration sample values based upon the absolute value of the summed sensed accelerations, for example.

The scaling constant may be based upon one of a walking, a crawling, and a running motion of the human user, for example. The at least one accelerometer may have a noise floor associated therewith. The controller may be configured to remove the noise floor by subtracting it from the estimated distance traveled prior to multiplying each acceleration sample value by a scaling constant.

A method aspect is directed to a method of determining an estimated distance traveled by a human user using an electronic navigation device. The electronic navigation device includes a housing to be carried by the human user, at least one accelerometer carried by the housing and configured to sense acceleration during motion of the human user, and a controller carried by the housing and coupled to the at least one accelerometer. The method includes using the controller to generate a plurality of acceleration sample values as the human user moves over a given distance. The method also includes using the controller to determine an estimated distance traveled by the human user during movement over the given distance by at least multiplying each acceleration sample value by a scaling constant, and summing results thereof.

BRIEF DESCRIPTION OF THE DRAWINGS

FIG. 4b is a graph an estimated distance traveled determined according to the present invention based upon the accelerations illustrated in the graph of FIG. 4a.

FIG. 5b is a graph of an estimated distance traveled determined according to the present invention based upon the accelerations illustrated in the graph of FIG. 5a.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1A:
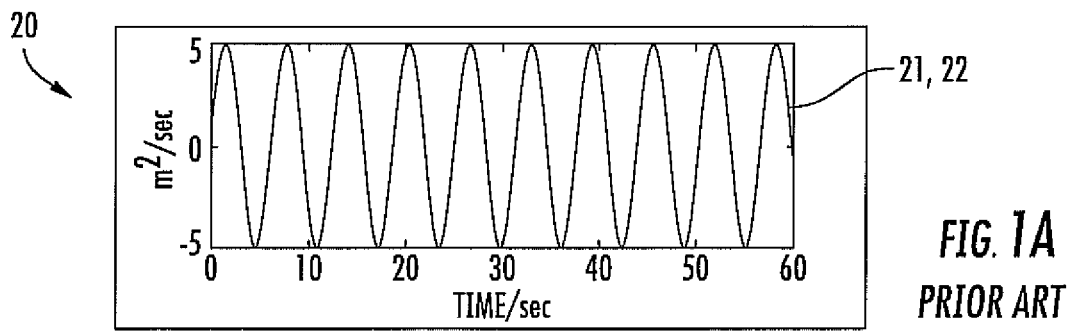
FIGS. 1a-1d are graphs illustrating acceleration, velocity, distance, and distance error determined using techniques according to the prior art.
Figure 1B:
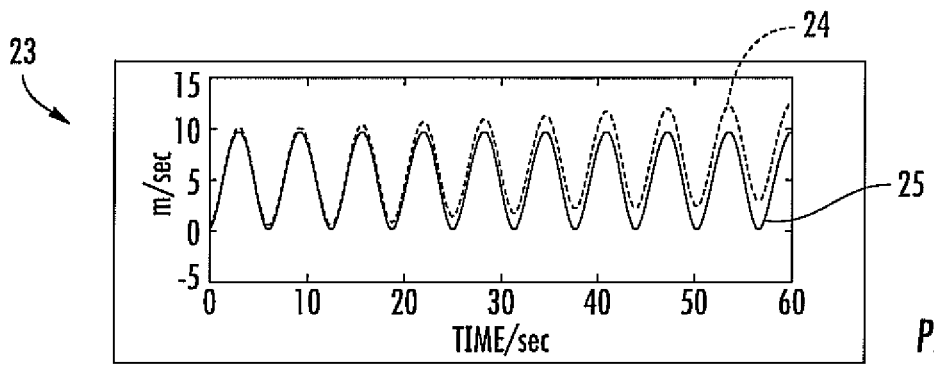
Figure 1C:
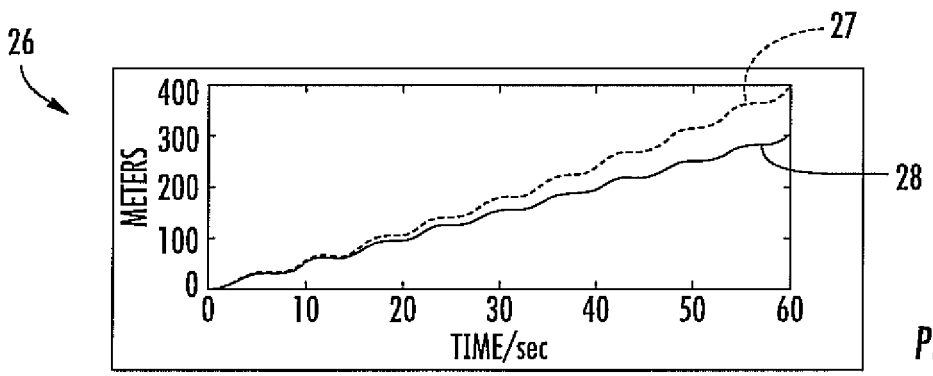
Figure 1D:
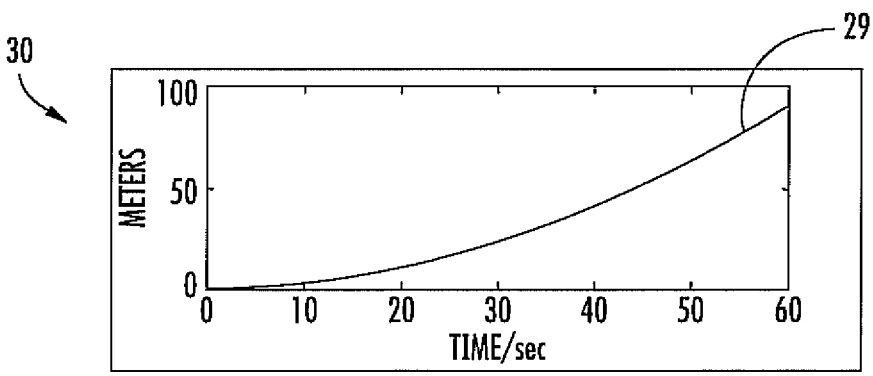
Figure 2:
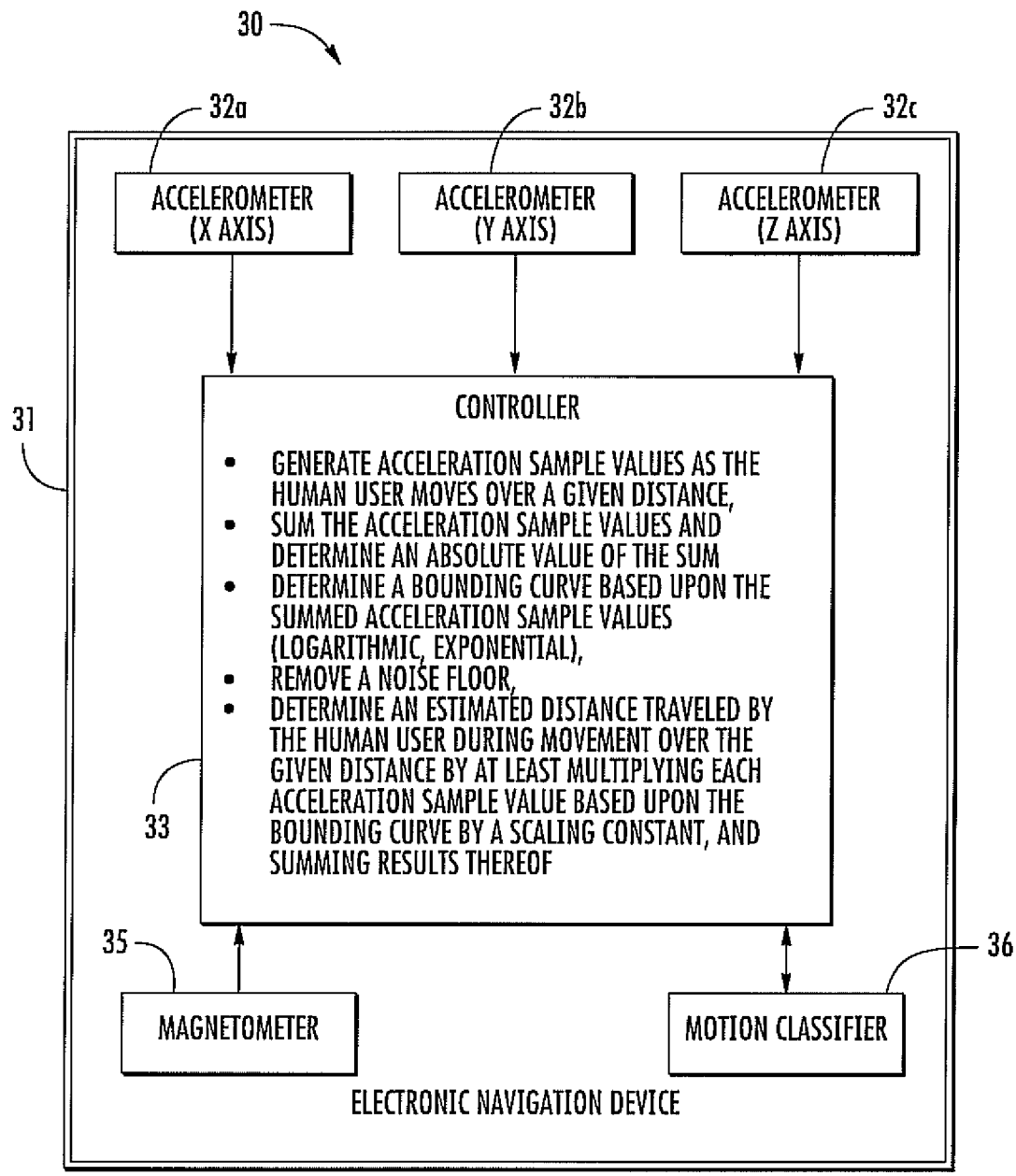
FIG. 2 is a schematic block diagram of an electronic navigation device in accordance with the present invention.
Figure 3:
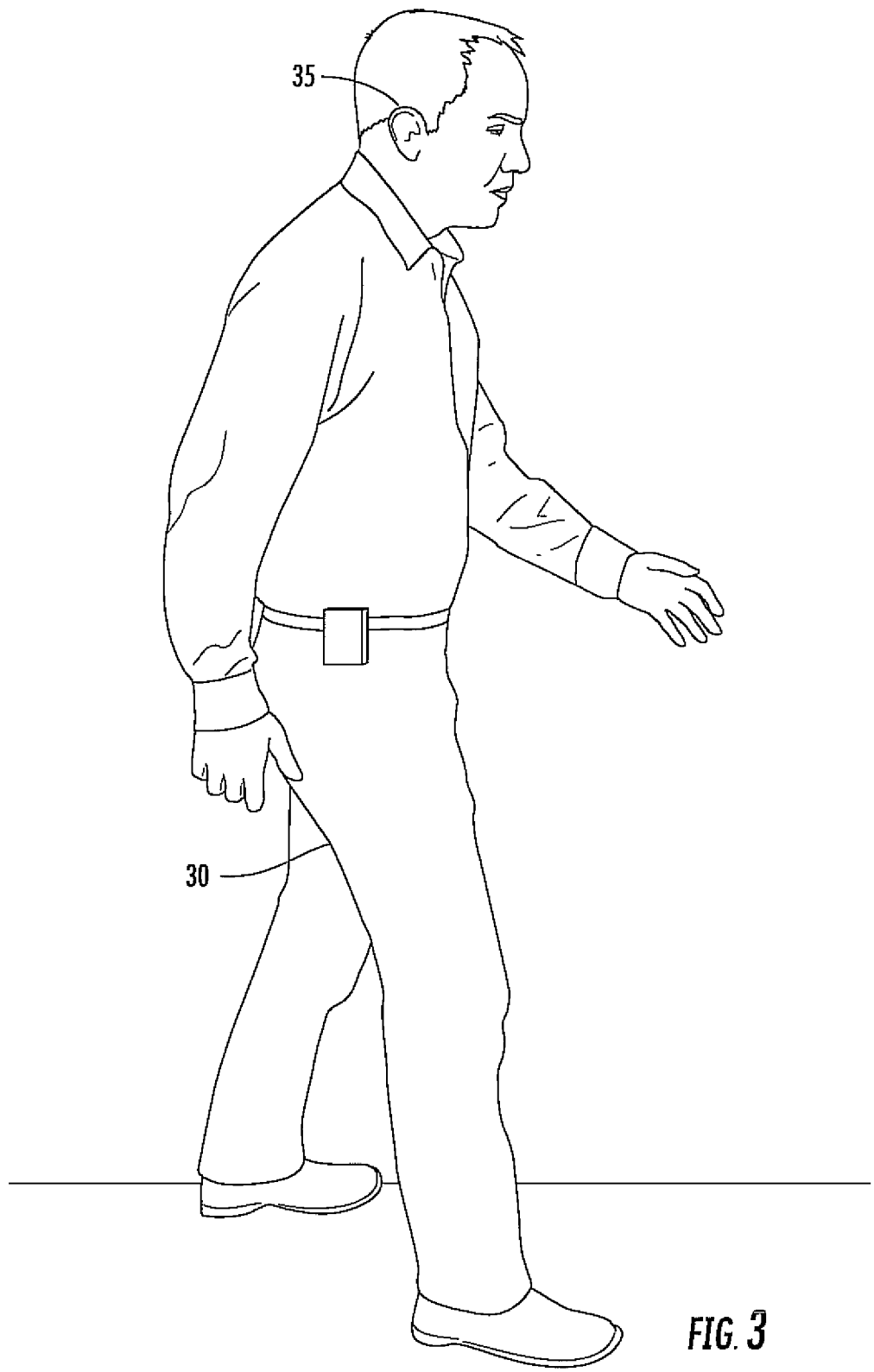
FIG. 3 is a diagram of the electronic navigation device of FIG. 2 being carried by a human user.

Referring initially to FIGS. 2 and 3, an electronic navigation device 30 for a human user 37 illustratively includes a housing 31 to be carried by the human user. The housing 31 may be carried by a limb of the human user 37, for example, an arm or a leg. Alternatively, the housing 31 may be carried by another part of the human user, for example, the waist (FIG. 3). The electronic navigation device 30 also includes three accelerometers 32a-32c each carried by the housing 31. Each of the three accelerometers 32a-32c is configured to sense acceleration during motion of the human user 37. More particularly, each accelerometer 32a-32c may be configured to sense acceleration along an axis, for example, the x, y, and z axes. Of course, any number of accelerometers may be used, and may be configured to sense an acceleration along any axis, and more than three accelerometers may also be used.

The electronic navigation device 30 also includes a controller 33 carried by the housing 31 and coupled to each accelerometer 32a-32c. The controller 33 may be implemented using hardware (e.g., memory, etc.) and software components, i.e., computer-readable instructions for causing the electronic navigation device 30 to perform the various functions or operations described herein.

The controller 33 is configured to generate acceleration sample values as the human user 37 moves over a given distance. For example, 820 samples per second may used to provide a sufficient number of samples to estimate a distance. The amount of sample acceleration values generates is adjustable, and thus, other sampling rates may be used. As will be appreciated by those skilled in the art, an increased amount of sample acceleration values may result in increased accuracy, but, may also use an increased amount of space or memory for storage.

The controller 33 is configured to sum the generated acceleration sample values from each of the accelerometers 32a-32c (i.e. x, y, and z axis). The controller 33 then generates an absolute value for the summed acceleration sample values. The absolute value of the summed acceleration sample values may be regarded as the "energy entity," for example. In other words, $$E=\mathrm{abs}(a1+a2+a3-1)$$

where E is the energy entity, and a1, a2, and a3 are the generated acceleration sample values in the x, y, and z axes, respectively. If, for example, less than three accelerometers are used, it may be desirable to apply an external input to the controller 33 to rotate the energy entity on a horizontal plane and not subtract "1".

The controller 33 may apply a bounding curve to the energy entity. As will be appreciated by those skilled in the art, the bounding curve advantageously sets limits, for example, on the energy entity, or in other words, reduces extraneous generated acceleration sample values. For example, for a running human, an acceleration that corresponds to over 10 meters per second (m/s) may be removed by the bounding curve, as very few humans can attain a velocity of 10 m/s running.

The bounding curve may be an exponential bounding curve for example. More particularly, the bounding curve may be determined and applied according to:

$$F(E)=(1-\exp(-A*E))$$

where A is an empirically determined bounding curve constant that has been determined based upon experimentation, for example, and E is the energy entity or sum the generated acceleration sample values from each of the accelerometers 32a-32c. In the present embodiment, the empirically determined bounding curve constant A is 0.025, but may be other values, for example, 0.125, as may be determined based upon calibrations and/or the type of motion of the human user 37, for example, a running, crawling, or walking motion. As will be appreciated by those skilled in the art, the empirically determined bounding curve constant may be determined based upon other factors.

Alternatively, the bounding curve may be a logarithmic bounding curve, for example. More particularly, the bounding curve may be determined and applied according to:

$$F(E)=\log(\mathrm{abs}(E))$$

where E is the energy entity or sum the generated acceleration sample values from each of the accelerometers 32a-32c. Indeed, the logarithmic bounding curve may be preferred over the exponential bounding curve, as is does not include an empirically determined bounding curve constant.

As will be appreciated by those skilled in the art, each of the accelerometers 32a-32c has a noise floor associated therewith, which is considered the stationary static energy. The noise floor may be removed from the energy entity or sum the generated acceleration sample values from each of the accelerometers 32a-32c after application of the bounding curve. In other words, $$F(E)=(F(E)-J)$$

where J is 0.005. Of course, J may be set to another value as determined by the accelerometers 32a-32c. As will be appreciated by those skilled in the art, the electronic navigation device 30 provides an increased accuracy distance estimation no matter where the housing 31 is to be carried by the human user 37.

The controller 33 is also configured to multiply each acceleration sample value, as output by the selected bounding curve, by a scaling constant (PSK). Similar to the empirically determined bounding curve scaling constant, as described above, the scaling constant is also empirically determined. The scaling constant may have a default value that is statistically determined based upon a type of motion of the human user 37, for example, walking, crawling, and/or running. For example, for a crawling human user 37, the scaling constant may have a smaller variance than the above-noted default scaling constant, which advantageously has been determined based upon walking of the human user. For running of the human user, the same scaling constant may be used, but the resultant variance may be larger.

Indeed, as will be appreciated by those skilled in the art, the scaling constant is generally increasingly similar among different human users, for example, less than a 10% variance among human users. The variance of the scaling constant among human users, for example, may be related to how tight the electronic navigation device 30 is carried by the human user 37. The scaling constant may also be adjusted to accommodate for the number of accelerometers.

The electronic navigation device 30 may also include a motion classifier 36 coupled to the controller 33 that may classify the human user's motion as running, walking, or crawling. The controller 33 may select the appropriate scaling constant based upon the type of motion.

The controller 33 performs the multiplication of each acceleration sample value according to:

$$\text{Distance}=PSK*F(E)$$

where distance is the distance traveled from the previous acceleration sample value, PSK is the scaling constant, and F(E) is the energy entity or sum the generated acceleration sample values from each of the accelerometers 32a-32c.

The controller 33 then sums the results of the multiplication of each acceleration sample value. Accordingly, a cumulative estimated distance traveled is determined. Indeed, as compared to prior approaches, the electronic navigation device 30 advantageously may avoid velocity drift. Further the electronic navigation device 30 also performs a single integration instead of a double integration. The electronic navigation device 30 also has an increased tolerance to noise. As will be appreciated by those skilled in the art, energy or vibrations are not linear, and while the human body vibrates largely, these vibrations do not translate directly to a distance traveled.

Additionally, it will be appreciated that the electronic navigation device 30 generates an estimated distance traveled, but may not generate or determine an estimated orientation or direction. To determine an estimated direction traveled by the human user 37, the electronic navigation device 30 may include a magnetometer 35 (compass), gyroscope, or other component for determining direction, as will be appreciated by those skilled in the art.

Figure 4A:
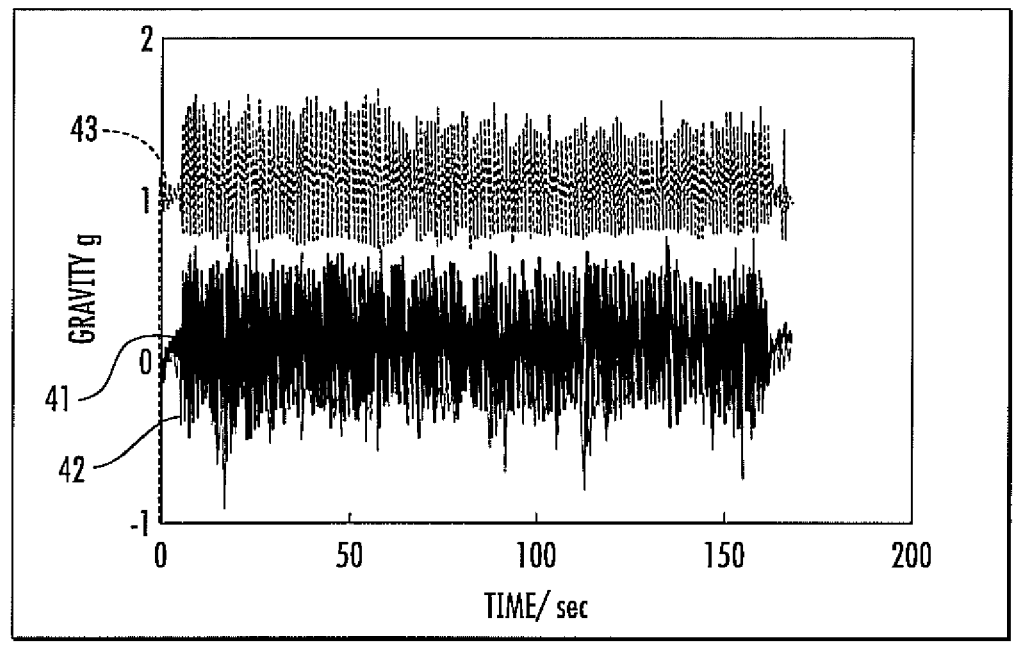
FIG. 4a is a graph of measured accelerations from accelerometers on three axes for a human user according to the present invention.
Figure 4B:
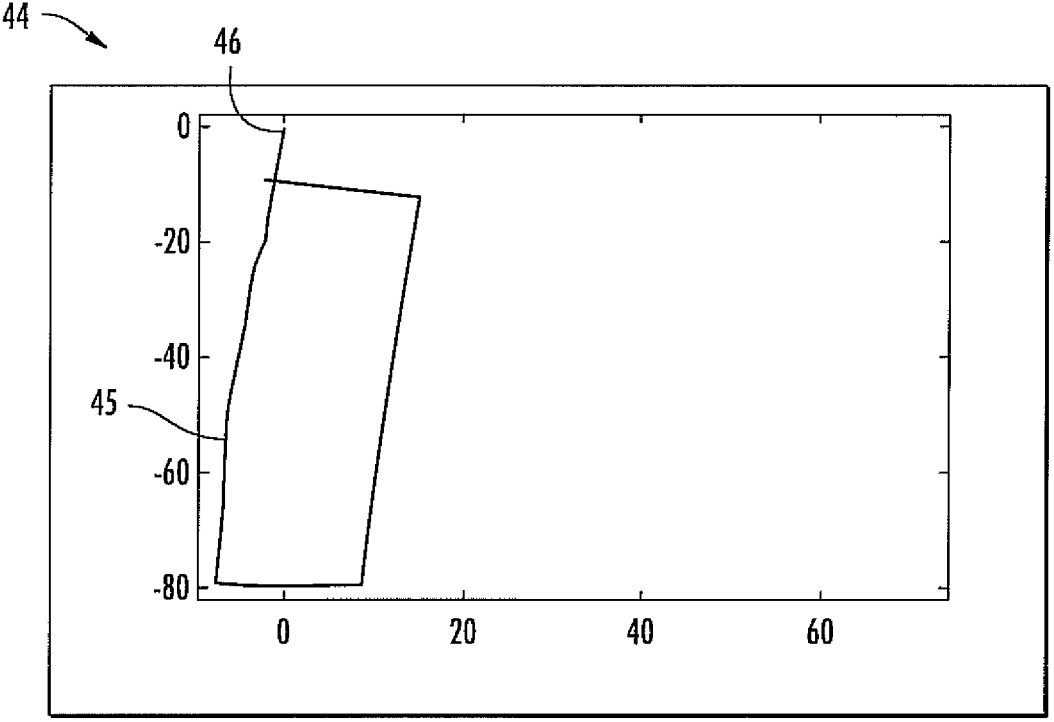

Referring now to FIGS. 4a and 4b, the graph 40 includes raw acceleration data from three accelerometers in the x, y, and z axes 41, 42, 43, respectively, from a prototype electronic navigation device similar to FIG. 1. To arrive at the result in the graph 40, a human user walked a rectangular track for a distance of 200 meters without stopping or standing. The graph 44 illustrates the position 45 in meters relative to the starting position. The end point 46 of the position of the human user is about 10 meters off from the starting point.

Figure 5A:
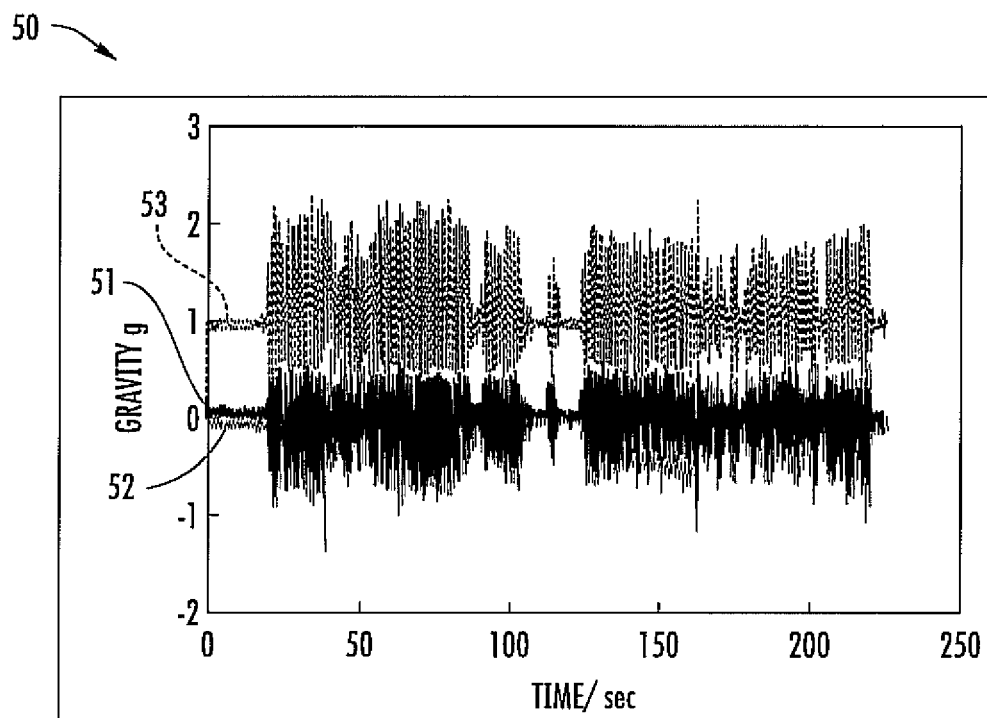
FIG. 5a is a graph of measured accelerations from accelerometers on three axes for another human user according to the present invention.
Figure 5B:
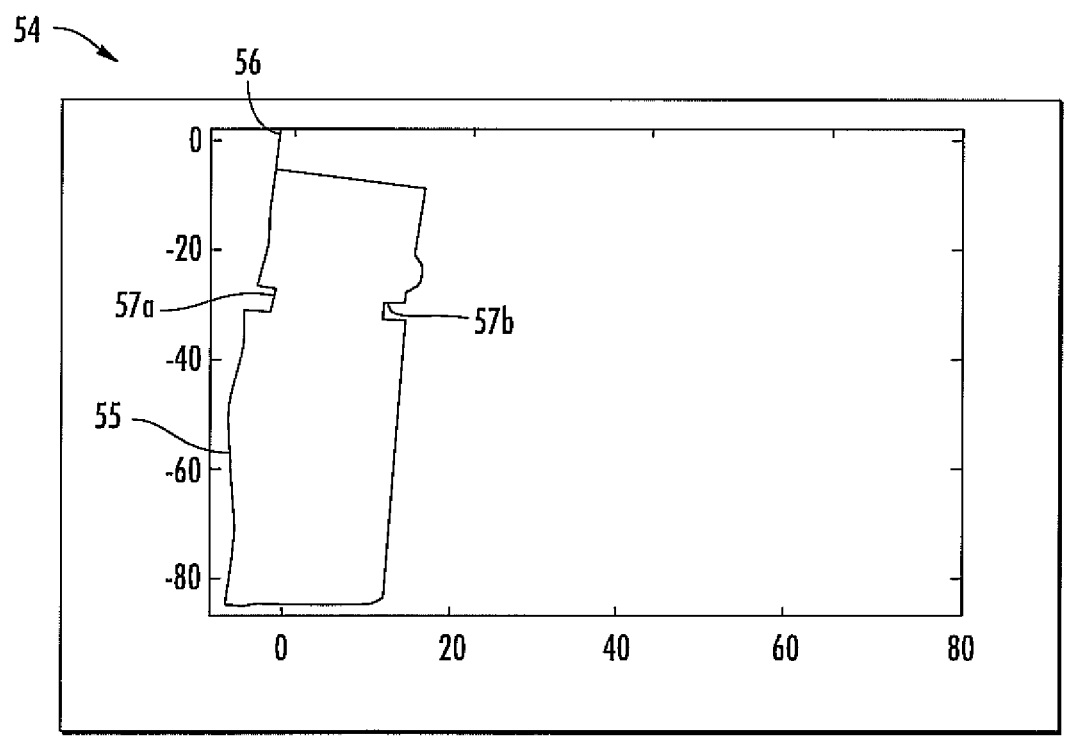

Referring now to FIGS. 5a and 5b, the graph 50 includes raw acceleration data from three accelerometers in the x, y, and z axes 51, 52, 53, respectively, from a prototype electronic navigation device similar to FIG. 1. To arrive at the result in the graph 50, a human user walked a rectangular track for a distance of 200 meters with stopping and/or standing. The graph 54 illustrates the position 55 in meters relative to the starting position. The end point 56 of the position of the human user is about 10 meters off from the starting point. The bumps 57a, 57b represent the actual path walked by the human user.

Figure 6:
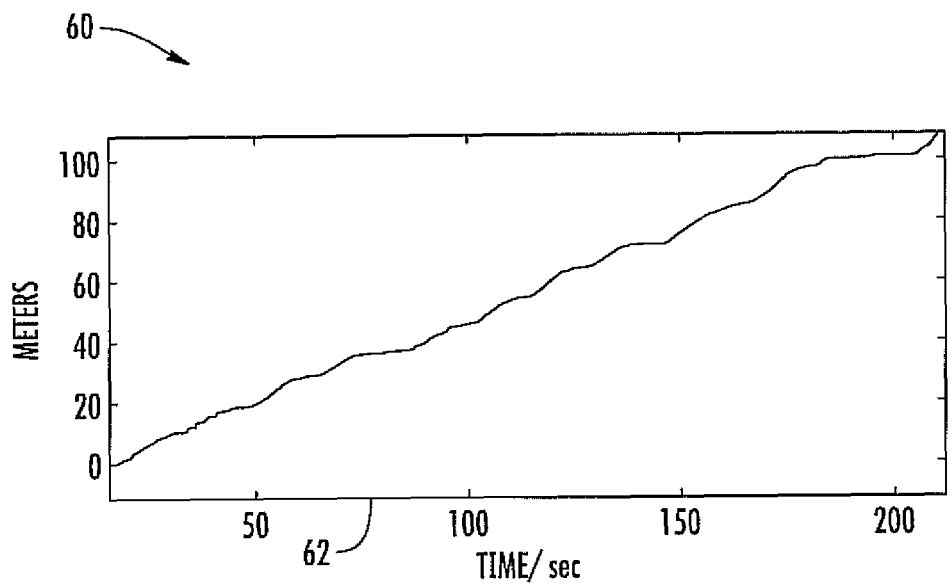
FIG. 6 is a graph of an estimated distance traveled according to the present invention using a default scaling constant.

Referring to the graph 60 in FIG. 6, calibration of an electronic navigation device similar to that described above with respect to FIG. 1, and more particularly, the calibration of the scaling constant is described. To calibrate or adjust the scaling the constant from the default value, for example, a human user walks a known length, for example, 100 meters. The estimated distance traveled is calculated using the default scaling constant. The default scaling constant is adjusted and calculated using the steps described herein. The estimated distance traveled by the human user over time based upon the default scaling constant is illustrated by line 62. Illustratively, between a time of 175-200 seconds, there it relatively little distance traveled. The scaling constant is adjusted so that estimated distance traveled matches a distance of 100 meters.

Figure 7:
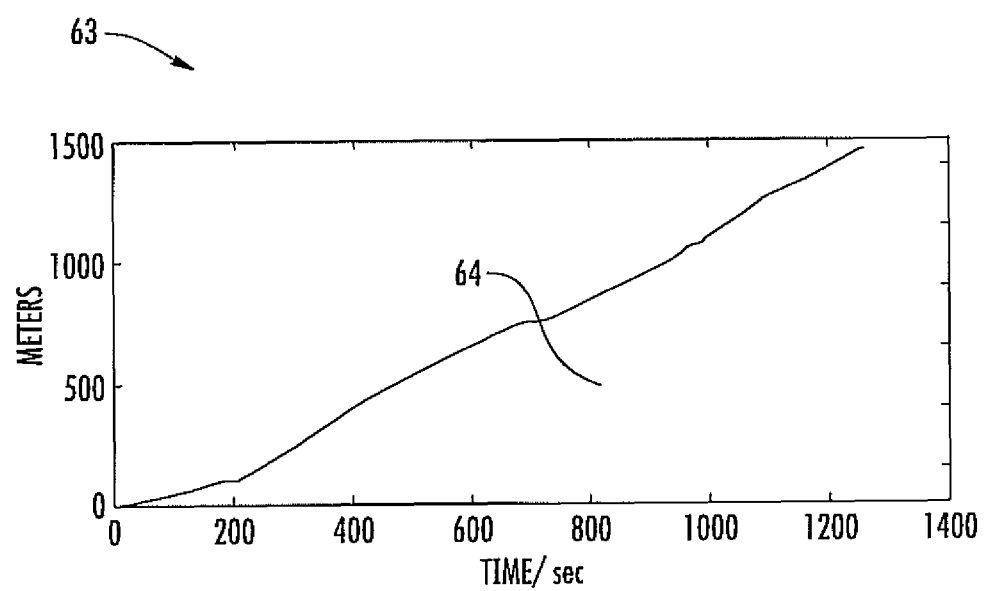
FIG. 7 is a graph of an estimated distance traveled according to the present invention using a default scaling constant and a calibrated scaling constant.

Referring now to the graph 63 in FIG. 7, calibration and post calibration estimated distances 64 determined by an electronic navigation device similar to that described above with respect to FIG. 1, and more particularly, the calibration of the scaling constant are illustrated. The true path or distance was 1466.74 meters. The electronic navigation device estimated the distance to be 1450 meters. The first 200 seconds were used for calibration. The remaining time illustrates the variation observed by the established constant. Generally, the electronic navigation device is increasingly accurate, and more particularly, had a error of about 3% to 7%. The distribution on accuracies is generally a probabilistic distribution.

As will be appreciated by those skilled in the art, the electronic navigation device 30 may be especially advantageous for locations where a global positioning system may not work, for example, within a building. Moreover, in determining the estimated distance traveled, the electronic navigation device 30 does not have dependency on previous sample, so errors are not compounding. Moreover, the electronic navigation device 30 does not rely on a zero-velocity determination, for example, determining when a step was taken, to estimate the distance traveled. Accordingly, the electronic navigation device may be less complex and may cost less to manufacture, for example.

Figure 8:
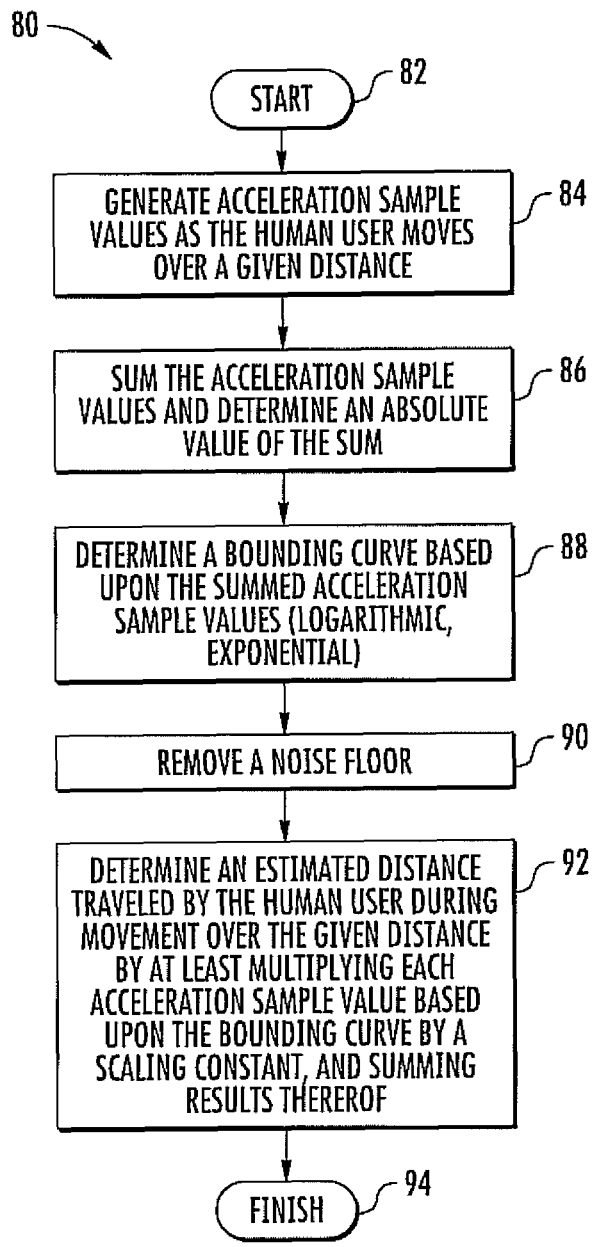
FIG. 8 is a flowchart of a method of determining an estimated distance traveled by a human user according to the present invention.

Referring now to the flowchart 80 in FIG. 8, a method of determining an estimated distance traveled by a human user 37 using an electronic navigation device 30 is illustrated. The electronic navigation device 30 includes a housing 31 to be carried by the human user, at least one accelerometer 32 carried by the housing and configured to sense acceleration during motion of the human user, and a controller 33 carried by the housing and coupled to the at least one accelerometer. Beginning at Block 82, the method includes using the controller 33 to generate a plurality of acceleration sample values as the human user 37 moves over a given distance (Block 84). At Block 86, the method includes using the controller 33 to sum the acceleration sample values and determine an absolute value of the sum. The method also includes determining a bounding curve based upon the summed acceleration sample values (Block 88). The bounding curve may be a logarithmic bounding curve or an exponential bounding curve, as described above. At Block 90, the method includes removing the noise floor from the summed acceleration sample values after applying the bounding curve. The method also includes using the controller 33 to determine an estimated distance traveled by the human user 37 during movement over the given distance by at least multiplying each acceleration sample value based upon the bounding curve by a scaling constant, and summing results thereof (Block 92). The method ends at Block 94.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic navigation device for a human user comprising:
    a housing to be carried by the human user;
    at least one accelerometer carried by said housing and configured to sense acceleration during motion of the human user; and
    a controller carried by said housing and coupled to said at least one accelerometer, and configured to
        generate a plurality of acceleration sample values as the human user moves over a given distance, and
        determine an estimated distance traveled by the human user during movement over the given distance by at least multiplying each acceleration sample value by a scaling constant, and summing results thereof.

2. The electronic navigation device according to claim 1, wherein said controller is configured to determine a bounding curve based upon the plurality of acceleration sample values, and determine the estimated distance based upon the bounding curve.

3. The electronic navigation device according to claim 2, wherein the bounding curve comprises a logarithmic bounding curve.

4. The electronic navigation device according to claim 2, wherein the bounding curve comprises an exponential curve.

5. The electronic navigation device according to claim 1, wherein said at least one accelerometer comprises a plurality of accelerometers configured to sense acceleration along respective different axes.

6. The electronic navigation device according to claim 5, wherein said controller is configured sum the sensed accelerations from each of the plurality of accelerometers; and wherein said controller is configured to generate the plurality of acceleration sample values based upon the summed sensed accelerations.

7. The electronic navigation device according to claim 6, wherein said controller is configured to determine an absolute value of the summed sensed accelerations; and wherein said controller is configured to generate the plurality of acceleration sample values based upon the absolute value of the summed sensed accelerations.

8. The electronic navigation device according to claim 1, wherein the scaling constant is based upon one of a walking, a crawling, and a running motion of the human user.

9. The electronic navigation device according to claim 1, wherein said at least one accelerometer has a noise floor associated therewith; and wherein said controller is configured to remove the noise floor by subtracting it from the estimated distance traveled prior to multiplying each acceleration sample value by a scaling constant.

10. An electronic navigation device for a human user comprising:
    a housing to be carried by the human user;
    a plurality of accelerometers carried by said housing and each configured to sense acceleration along respective different axes during motion of the human user; and
    a controller carried by said housing and coupled to said plurality of accelerometers, and configured to
        generate a plurality of acceleration sample values as the human user moves over a given distance based upon a sum of the sensed acceleration from each of said plurality of accelerometers, and
        determine an estimated distance traveled by the human user during movement over the given distance by at least multiplying each acceleration sample value by a scaling constant, and summing results thereof.

11. The electronic navigation device according to claim 10, wherein said controller is configured to determine a bounding curve based upon the plurality of acceleration sample values, and determine the estimated distance based upon the bounding curve.

12. The electronic navigation device according to claim 11, wherein the bounding curve comprises one of a logarithmic bounding curve and an exponential curve.

13. The electronic navigation device according to claim 10, wherein said plurality of accelerometers are configured to sense acceleration along respective different axes.

14. The electronic navigation device according to claim 10, wherein said controller is configured to determine an absolute value of the summed sensed accelerations; and wherein said controller is configured to generate the plurality of acceleration sample values based upon the absolute value of the summed sensed accelerations.

15. A method of determining an estimated distance traveled by a human user using an electronic navigation device comprising a housing to be carried by the human user, at least one accelerometer carried by the housing and configured to sense acceleration during motion of the human user, and a controller carried by the housing and coupled to the at least one accelerometer, the method comprising:
    using the controller to generate a plurality of acceleration sample values as the human user moves over a given distance; and
    using the controller to determine an estimated distance traveled by the human user during movement over the given distance by at least multiplying each acceleration sample value by a scaling constant, and summing results thereof.

16. The method according to claim 15, further comprising using the controller to determine a bounding curve based upon the plurality of acceleration sample values, and determine the estimated distance based upon the bounding curve.

17. The method according to claim 16, wherein using the controller to determine a bounding curve comprises using the controller to determine a logarithmic bounding curve.

18. The method according to claim 16, wherein using the controller to determine a bounding curve comprises using the controller to determine exponential bounding curve.

19. The method according to claim 15, wherein the at least one accelerometer comprises a plurality of accelerometers configured to sense acceleration along respective different axes.

20. The method according to claim 15 further comprising using the controller to sum the sensed acceleration from each of the plurality of accelerometers; and wherein using the controller to generate the plurality of acceleration sample values based upon sensed acceleration from each of the plurality of accelerometers comprises using the controller to generate the plurality of acceleration sample values based upon the summed sensed accelerations.

\* \* \* \* \*